Dec. 4, 1951 L. E. CULLEN 2,577,233
HOG CHUTE
Filed Nov. 24, 1950 2 SHEETS—SHEET 1
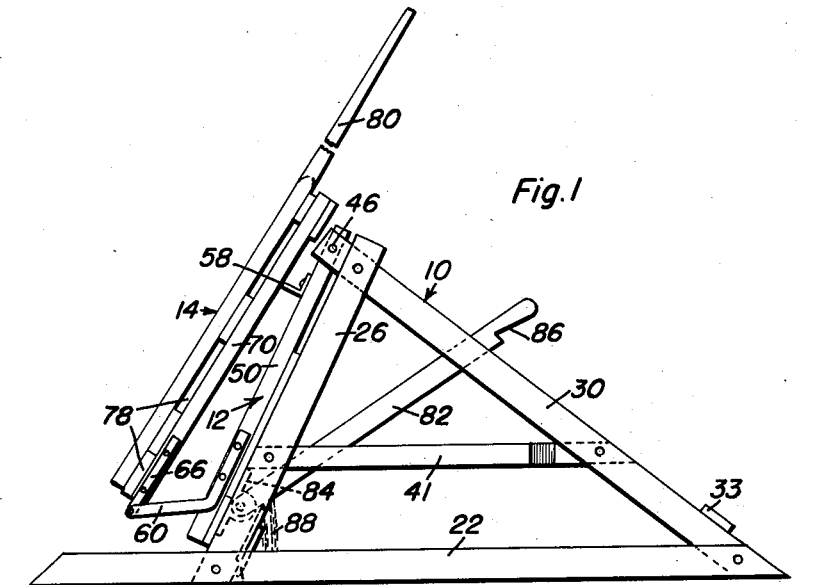
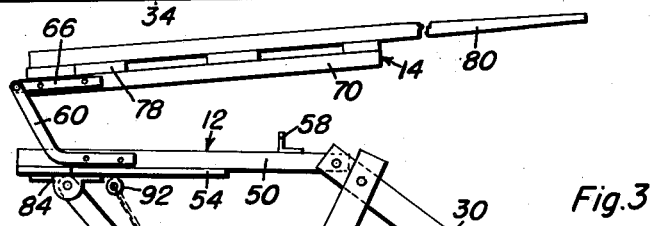
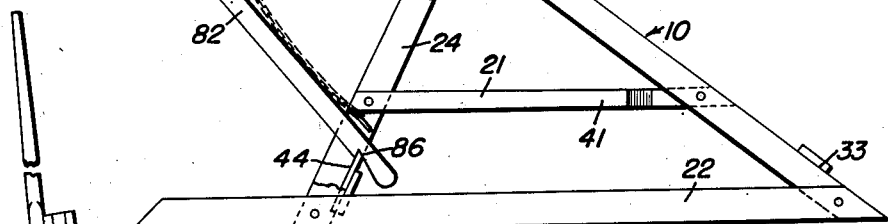
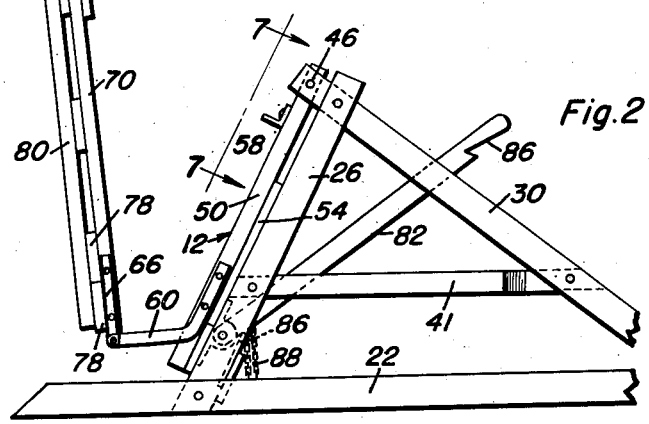
Lawrence E. Cullen
INVENTOR.

Dec. 4, 1951 L. E. CULLEN 2,577,233
HOG CHUTE
Filed Nov. 24, 1950 2 SHEETS—SHEET 2
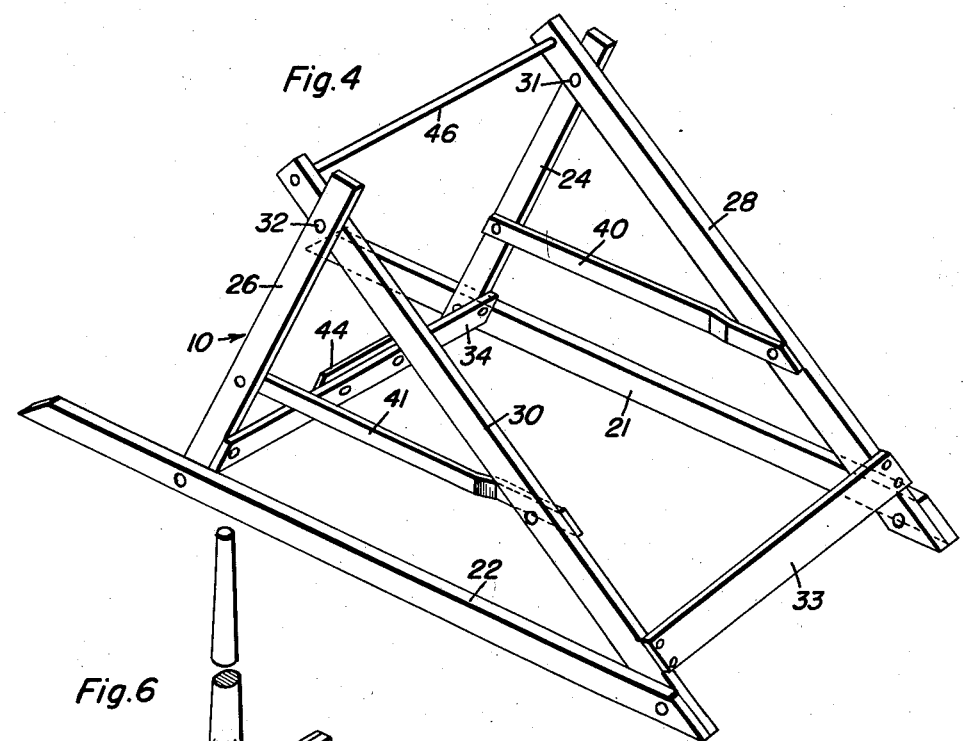
Lawrence E. Cullen
INVENTOR.
BY
Attorneys

Patented Dec. 4, 1951

2,577,233

UNITED STATES PATENT OFFICE 2,577,233

HOG CHUTE

Lawrence E. Cullen, Orient, Iowa

Application November 24, 1950, Serial No. 197,404

1 Claim. (Cl. 119—103)

This invention relates to an animal holding and handling device.

An object of this invention is to provide an approved animal handling device which is relatively small whereby its principal use is in connection with small hogs or pigs, said device including a base having an inclined wall with a panel located on an incline on said wall and pivoted at its upper end to the top part of the base to constitute a part of a clamp, said panel cooperating with a member having a handle on it extending from its upper end and hinged to the lower end of the panel so that when the handle is moved in one direction the member is separated from the handle allowing the entrance of a pig and then, when the handle is moved in the opposite direction the pig is squeezed between the panel and the member and upon further application of a force on the handle in the last named direction, the entire member and panel as a unit is lifted thereby moving the pig upward for various standard operations thereon, as vaccination.

A further object of this invention is to provide a means for holding the panel and the member in the substantially horizontal position for facility of working upon the animal and to provide a means for preventing excessive pivotal movement of the panel and the member.

Other objects and features of importance will become apparent in following the description of the illustrated form of the invention.

In the drawings:

Figure 1 is an elevational view of the device showing the parts in one position;

Figure 2 is an elevational view of the device showing the clamp member open with respect to the clamp panel;

Figure 3 is an elevational view showing the panel and the member elevated and held in place by a locking means;

Figure 4 is a perspective view of the base;

Figure 5 is a perspective view of the panel;

Figure 6 is a perspective view of the clamp member; and

Figure 7 is a fragmentary elevational view taken substantially on the line 7—7 of Figure 2 and in the direction of the arrows.

As illustrated in Figure 1 there is a base generally indicated at 10. In Figure 5 I have illustrated generally a panel 12 and then in Figure 6 there is a clamp member 14. These three generally indicated assemblies constitute the important main elements of the device.

The base 10 is composed of a pair of bottom members 21 and 22 and a pair of front members 24 and 26 are secured at their lower ends to the base members 21 and 22. Supporting legs 28 and 30 are secured as by pins 31 and 32 to the inclined members 24 and 26 and are suitably secured to the rear ends of the base members 21 and 22. By virtue of this construction there is provided an angularly inclined front wall in the base.

Suitable braces, as those indicated at 33 and 34 connect the legs 28 and 30 together and also the inclined members 24 and 26. For further rigidity of construction side members 40 and 41 are fixed to the inclined member 24 and one leg 28 and also the inclined member 26 and the leg 30. Any suitable and standard means of connecting these elements together may be used, for example bolts, rivets, welding when an all metal construction is used or other forms of fastening devices.

There is a stop plate 44 secured to the cross member 34 intermediate its ends and there is a pivot bar 46 connected to the upper ends of the legs 28 and 30, this pivot bar being considered as a part of the inclined front wall construction of the base.

Attention is now invited to Figure 5. The panel 12 constitutes a part of a clamp for holding an animal in place. The panel comprises a pair of members 50 and 51 having a lower cross member 52 connected to them and an upper cross member 54 also connected to them. This upper cross member 54 is provided with a lateral extension 56 which forms a seat for a part of the animal clamped therein and when the panel is in the substantially horizontal position as disclosed in Figure 3, the extension 56 constitutes a work table.

There is an angle iron brace 58 secured to the members 50 and 51 by standard means and serves as a stop (Figure 1) for the clamp member 14 when the clamp member is in the rest position.

Arms 60 and 62 are fixed to the members 50 and 51 and these arms constitute hinge assemblies when taken in conjunction with the bars 64 and 66 which are fixed to the sides 68 and 70 of the clamp member 14.

The upper ends of the panel members 50 and 51 have bores or passages 72 and 74 therein through which the pivot bar 46 is passed. This mounts the panel 12 on the inclined front facial surface of the base 10 for pivotal or swinging movement about the bar or panel 12 as a pivot axis.

Attention is now invited specifically to the clamp member 14. The flat bars 64 and 66 are connected to the hinge members 60 and 62 by means of pivot pins, thereby pivotally connecting the clamp member 14 at its lower end to the lower end of the panel 12.

The sides 68 and 70 of the clamp member 14 are connected together by a suitable number of cross members 78, some of the cross members being spaced sufficiently to allow access to the animal while it is retained between the clamp member 14 and the panel 12.

There is a handle 80 secured to some of the cross members by suitable means and this handle extends upwardly beyond the upper end of the clamp member 14. The handle is adapted to be manually operated.

There is a means provided for the purpose of holding the panel 14 in the substantially horizontal position (Figure 3). The preferable means consists of a latch bar 82 which is pivoted in a bearing 84 at one end and which is provided with a notch 86 at the other end. The bearing 84 is carried by one or more of the cross members 78 while the notch 86 is arranged to seat upon the lock plate 44 releasably. This retains the panel 12 in the substantially horizontal position.

A means is provided for the purpose of preventing excess movement of the panel 12, this means constituting a stop for the panel. As illustrated in Figure 3 the last mentioned means preferably consists of a chain 88 which is connected by means of the eye 92 to the panel 12 and also to a suitable part of the base.

In operation the device is located in such position that the animals enter the space between the clamp member 12 and the clamp member 14. Then, the handle 80 is pulled manually thereby squeezing the clamp member 14 toward the panel 12 and against the animal located between the clamp members 12 and 14. Upon further pulling of the handle the member 14 and the member 12 move as a unit about the pivot bar 46 as an axis thereby elevating the panel 12 to the substantially horizontal position as disclosed in Figure 3. Then the lock bar 82 falls by gravity so that the notch 86 thereof engages with the upper edge of the lock plate 44, holding the panel 12 in place.

After the work on the animal is completed, the latch bar 82 is released thereby allowing the member 14 and the panel 12 to return by the pull of gravity.

Having described the invention, what is claimed as new is:

An animal holding device comprising a base, a panel pivoted at its upper end to said base and constituting a part of a clamp, a clamp member, a hinge connecting the lower end of said clamp member with the lower end of said panel and holding the lower ends of said panel and said clamp members spaced from each other, a rest spaced from said hinge and secured to said panel to hold the confronting surfaces of said panel and clamp member near the upper end of said panel spaced from each other, said clamp member constituting the remaining part of said clamp, a handle secured to said clamp member and arranged to pull said clamp member toward said panel to thereby squeeze an animal between said clamp member and said panel and to thereby pivotally actuate said panel to the substantially horizontal position, a latch bar having a notch and pivotally connected to said panel for releasably holding said panel in said substantially horizontal position, a locking plate fixed to said base and engageable by the notch in said bar, and a flexible member connected to said base and said panel constituting a stop to limit the movement in one direction of said panel.

LAWRENCE E. CULLEN.

REFERENCES CITED

The following references are of record in the file of this patent:

UNITED STATES PATENTS

| Number | Name | Date |
| --- | --- | --- |
| 538,442 | Driver | Apr. 30, 1895 |
| 1,443,561 | Clark | Jan. 30, 1923 |
| 2,126,593 | Walsh | Aug. 9, 1938 |
| 2,458,582 | Flohr, Jr. | Jan. 11, 1949 |
| 2,477,213 | Staggs | July 26, 1949 |
| 2,478,888 | Thompson et al. | Aug. 9, 1949 |
| 2,520,585 | Walker et al. | Aug. 29, 1950 |